US012749962B2

(12) United States Patent
Zhao et al.

(10) Patent No.: US 12,749,962 B2
(45) Date of Patent: Sep. 29, 2026

(54) SYNCHRONOUS RECTIFICATION CHIP PIN MULTIPLEXING TECHNOLOGY

(71) Applicant: Diodes Incorporated, Plano, TX (US)

(72) Inventors: Andong Zhao, Shanghai (CN); Zheng Ying, Shanghai (CN); Shaohua Peng, Shanghai (CN); Chao Chen, Shanghai (CN); Xuezheng Ding, Shanghai (CN); Qikun Wu, Shanghai (CN); Sen Dou, Shanghai (CN); Yizhong Xie, Shanghai (CN)

(73) Assignee: DIODES INCORPORATED, Plano, TX (US)

( * ) Notice: Subject to any disclaimer, the term of this patent is extended or adjusted under 35 U.S.C. 154(b) by 68 days.

(21) Appl. No.: 18/665,006

(22) Filed: May 15, 2024

(65) Prior Publication Data

US 2024/0388189 A1 Nov. 21, 2024

Related U.S. Application Data

(63) Continuation of application No. PCT/CN2023/118455, filed on Sep. 13, 2023.

(30) Foreign Application Priority Data

May 19, 2023 (CN) ........................ 202310572525.1

(51) Int. Cl.
*H02M 1/00* (2006.01)
*H02M 3/335* (2006.01)

(52) U.S. Cl.
CPC ....... *H02M 1/0003* (2021.05); *H02M 1/0048* (2021.05); *H02M 3/33523* (2013.01)

(58) Field of Classification Search
CPC ............. H02M 1/0003; H02M 1/0048; H02M 3/33523
See application file for complete search history.

(56) References Cited

U.S. PATENT DOCUMENTS

| | | | | |
|---|---|---|---|---|
| 9,595,885 | B2 * | 3/2017 | Wang | H02M 7/217 |
| 10,014,786 | B2 * | 7/2018 | Yang | H02M 3/33523 |

(Continued)

FOREIGN PATENT DOCUMENTS

| | | | |
|---|---|---|---|
| CN | 102783005 | A | 11/2012 |
| CN | 106026712 | A | 10/2016 |

(Continued)

OTHER PUBLICATIONS

Office Action and Search Report from Taiwan Patent Application No. 112131026, dated Jul. 26, 2024, 9 pages.

(Continued)

*Primary Examiner* — Adolf D Berhane
(74) *Attorney, Agent, or Firm* — Kilpatrick Townsend & Stockton LLP

(57) ABSTRACT

Aa switching power supply is provided. The switching power supply may include: a protocol circuit disposed on a secondary side of the switching power supply and configured to detect a power supply demand of a load device connected to the protocol circuit; a synchronous rectifier circuit disposed on the secondary side of the switching power supply and configured to control a rectifier power tube; and a signal transmission circuit disposed between the protocol circuit and the synchronous rectifier circuit and configured to transmit a signal between the protocol circuit and the synchronous rectifier circuit.

20 Claims, 8 Drawing Sheets

(56) References Cited

U.S. PATENT DOCUMENTS

| | | | | |
|---|---|---|---|---|
| 11,626,871 | B2 * | 4/2023 | Miletic | H02M 3/33571 363/21.14 |
| 2013/0285757 | A1 | 10/2013 | Cheng et al. | |
| 2017/0222568 | A1 | 8/2017 | Choi et al. | |
| 2017/0302194 | A1 * | 10/2017 | Zhang | H02M 7/219 |
| 2018/0131283 | A1 | 5/2018 | Ono | |
| 2019/0296651 | A1 | 9/2019 | Tang et al. | |
| 2022/0014108 | A1 | 1/2022 | Zhang et al. | |
| 2022/0045540 | A1 | 2/2022 | Zhang et al. | |
| 2022/0060116 | A1 | 2/2022 | Wu et al. | |

FOREIGN PATENT DOCUMENTS

| | | | |
|---|---|---|---|
| CN | 114421566 | A | 4/2022 |
| CN | 114513114 | A | 5/2022 |
| CN | 114567155 | A | 5/2022 |
| CN | 114938043 | A | 8/2022 |
| CN | 115498725 | A | 12/2022 |
| JP | 05290186 | A | 11/1993 |
| JP | 2010166729 | A | 7/2010 |

OTHER PUBLICATIONS

Extended European Search Report for European Application No. 24176748.2, mailed Oct. 15, 2024, 12 pages.

InnoSwitch3-Pro Family, “Digitally Controllable Off-Line CV/CC QR Flyback Switcher IC with Integrated High-Voltage Switch, Synchronous Rectification and FluxLink Feedback,” Power Integrations, Nov. 2022, 58 pages, Retrieved from the Internet: URL:https://www.power.com/sites/default/files/documents/innoswitch3-pro_family_datasheet.pdf.

Zhao C., et al., “Improved Synchronous Rectifier Driving Strategy for Primary-Side Regulated (PSR) Flyback Converter in Light-Load Mode,” IEEE Transactions on Power Electronics, Institute of Electrical and Electronics. Engineers, 2014, vol. 29, No. 12, pp. 6506-6517.

Japanese Patent Application No. 2024-532861, Office Action mailed on Sep. 30, 2025, 23 pages.

Japanese Patent Application No. 2024-532861, Office Action mailed on May 12, 2026, 20 pages.

* cited by examiner

SYNCHRONOUS RECTIFICATION CHIP PIN MULTIPLEXING TECHNOLOGY

CROSS-REFERENCES TO RELATED APPLICATIONS

The present application is a continuation of International Patent Application No. PCT/CN2023/118455 filed Sep. 13, 2023, and entitled "SWITCHING POWER SUPPLY, SYNCHRONOUS RECTIFIER CHIP, AND PROTOCOL CHIP", which claims priority to Chinese Patent Application No. 202310572525.1, filed on May 19, 2023, and entitled "SWITCHING POWER SUPPLY, SYNCHRONOUS RECTIFIER CHIP, AND PROTOCOL CHIP", the disclosures of which are hereby incorporated by reference in their entirety.

TECHNICAL FIELD

The present application relates to the technical field of power electronics and relates, in particular, to a switching power supply, a synchronous rectifier chip, and a protocol chip.

BACKGROUND OF THE INVENTION

In the prior art, switching power supplies use a synchronous rectifier tube to replace a diode in a secondary side of a flyback converter, which can effectively reduce conduction loss of the diode in the secondary side and better improve the conversion efficiency of the system. To adapt to different system application requirements and implement user-defined programmability, an input terminal in a synchronous rectifier circuit is usually provided to set a threshold used as a criterion for turning on the synchronous rectifier tube. The main function of a protocol circuit is to detect, according to different chargers, an internal protocol of a charging device under a protocol framework and allow the switching power supply to output a suitable voltage and current based on a load connected to the switching power supply.

Currently, there is no communication between synchronous rectifier circuits and protocol circuits in the prior art. Therefore, the working mode of the synchronous rectifier chip cannot be adjusted based on a load connected to the protocol circuit, resulting in no information exchange between the two circuits (i.e., the synchronous rectifier circuit and the protocol circuit), and standby power consumption of the switching power supply cannot be reduced.

SUMMARY OF THE INVENTION

The present application is intended to provide a switching power supply, a synchronous rectifier chip, and a protocol chip. A signal transmission circuit is established to implement communication between a synchronous rectifier circuit and a protocol circuit, so that the working mode of the synchronous rectifier circuit can be controlled according to the power supply demand of a load device detected by the protocol circuit, thus improving communication between the synchronous rectifier chip and the protocol chip of the switching power supply, and further reducing the power consumption of switching power supply.

To resolve the above technical problem, the present application provides a switching power supply, comprising: a protocol circuit disposed on a secondary side of the switching power supply and configured to detect the power supply demand of a load device; a synchronous rectifier circuit disposed on the secondary side of the switching power supply and configured to control a rectifier power tube; and a signal transmission circuit disposed between the protocol circuit and the synchronous rectifier circuit and configured to transmit a signal.

Preferably, the signal transmission circuit comprises a switching circuit and a signal identification circuit; an input terminal of the switching circuit is connected to the protocol circuit, an output terminal of the switching circuit is connected to an input terminal of the signal identification circuit, and an output terminal of the signal identification circuit is connected to the synchronous rectifier circuit; the switching circuit is configured to adjust the switching state of the switching circuit according to a detection result outputted by the protocol circuit, so as to output a power supply demand signal; and the signal identification circuit is configured to output a control signal to the synchronous rectifier circuit according to the power supply demand signal outputted by the switching circuit, to influence the working mode of the synchronous rectifier circuit.

Preferably, the switching circuit comprises a controllable switching transistor, a control terminal of the controllable switching transistor is the input terminal of the switching circuit, and an output terminal of the controllable switching transistor is the output terminal of the switching circuit.

Preferably, when the controllable switching transistor is an n-type metal-oxide-semiconductor (NMOS) transistor, a gate of the NMOS transistor is the control terminal of the controllable switching transistor, a source of the NMOS transistor is the output terminal of the controllable switching transistor, and a drain of the NMOS transistor is grounded.

Preferably, an impedance component is further disposed between the switching circuit and the signal identification circuit.

Preferably, when the power supply demand signal is a voltage signal or a current signal, the signal identification circuit comprises a comparison circuit; a first input terminal of the comparison circuit is connected to the output terminal of the switching circuit, a second input terminal of the comparison circuit is connected to a reference voltage output device or a reference current output device, and an output terminal of the comparison circuit is connected to the synchronous rectifier circuit; and the comparison circuit is configured to compare the voltage at the output terminal of the switching circuit with a reference voltage or compare the current at the output terminal of the switching circuit with a reference current, and output the control signal to the synchronous rectifier circuit according to a comparison result, thus influencing the working mode of the synchronous rectifier circuit.

Preferably, the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

Preferably, the comparison circuit further comprises a current source; the first input terminal of the comparison circuit is further connected to the current source, and the second input terminal of the comparison circuit is connected to the reference voltage output device; and the comparison circuit is specifically configured to compare the voltage at the output terminal of the switching circuit with the reference voltage, and output the control signal to the synchronous rectifier circuit according to the comparison result, thus influencing the working mode of the synchronous rectifier circuit.

Preferably, the comparison circuit further comprises a current mirror; an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and the comparison circuit is specifically configured to compare the current at the output terminal of the switching circuit with the reference current, and output the control signal to the synchronous rectifier circuit according to the comparison result, thus influencing the working mode of the synchronous rectifier circuit.

To resolve the above technical problem, the present application further provides a synchronous rectifier chip, used in a secondary side of a switching power supply comprising a protocol chip. The synchronous rectifier chip includes: a control pin, configured to control the turning on and turning off of a rectifier power tube according to an input signal; and a receiving pin, connected to the protocol chip and configured to receive a power supply demand signal representing a switching power supply load device and influence the working mode of the synchronous rectifier chip.

Preferably, the receiving pin is connected to an external impedance component.

Preferably, the synchronous rectifier chip further comprises a signal identification circuit; and the signal identification circuit is configured to identify the received power supply demand signal and influence the working mode of the synchronous rectifier chip according to the power supply demand signal.

Preferably, when the power supply demand signal is a voltage signal or a current signal, the signal identification circuit includes a comparison circuit; a first input terminal of the comparison circuit is connected to an output terminal of the switching circuit, a second input terminal of the comparison circuit is connected to a reference voltage output device or a reference current output device, and an output terminal of the comparison circuit is connected to the control pin; and the comparison circuit is configured to compare the voltage at the output terminal of the switching circuit with a reference voltage or compare the current at the output terminal of the switching circuit with a reference current, and output the control signal to the synchronous rectifier circuit according to a comparison result, thus influencing the working mode of the synchronous rectifier chip.

Preferably, the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

Preferably, the comparison circuit further comprises a current source; the first input terminal of the comparison circuit is further connected to the current source, and the second input terminal of the comparison circuit is connected to the reference voltage output device; and the comparison circuit is specifically configured to compare the voltage at the output terminal of the switching circuit with the reference voltage, and output the control signal to the control pin according to the comparison result, thus influencing the working mode of the synchronous rectifier circuit.

Preferably, the comparison circuit further comprises a current mirror; an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and the comparison circuit is specifically configured to compare the current at the output terminal of the switching circuit with the reference current, and output the control signal to the control pin according to the comparison result, thus influencing the working mode of the synchronous rectifier circuit.

To resolve the above technical problem, the present application further provides a protocol chip, used in a secondary side of a switching power supply provided with a synchronous rectifier chip. The protocol chip comprises: a detection pin, configured to detect the power supply demand of a load device; and an output pin, configured to transmit the power supply demand signal to the synchronous rectifier chip, so as to influence the working mode of the synchronous rectifier chip.

Preferably, the protocol chip further comprises a switching circuit and a detection circuit; an input terminal of the switching circuit is connected to the detection circuit, and an output terminal of the switching circuit is connected to the output pin; and the switching circuit is configured to adjust the switching state of the switching circuit according to a detection result outputted by the detection circuit, so as to output the power supply demand signal by means of the output pin.

Preferably, the switching circuit comprises a controllable switching transistor, a control terminal of the controllable switching transistor is connected to the detection pin, and an output terminal of the controllable switching transistor is connected to the output pin.

To resolve the above technical problem, the present application further provides a switching power supply, comprising: the protocol chip as described above; and the synchronous rectifier chip as described above.

Preferably, an impedance component is disposed between the output pin of the protocol chip and the receiving pin of the synchronous rectifier chip.

The present application provides a switching power supply, a synchronous rectifier chip, and a protocol chip, and relates to the technical field of power electronics. The switching power supply comprises: a protocol circuit disposed on a secondary side of the switching power supply and configured to detect the power supply demand of a load device; a synchronous rectifier circuit disposed on the secondary side of the switching power supply and configured to control a rectifier power tube; and a signal transmission circuit disposed between the protocol circuit and the synchronous rectifier circuit and configured to transmit a signal. Hence, for the switching power supply in the present application, the signal transmission circuit is established to implement communication between the synchronous rectifier circuit and the protocol circuit, so that the working mode of the synchronous rectifier circuit can be controlled to enter a sleep mode according to the power supply demand of the load device detected by the protocol circuit, and most power consumption modules can be turned off, reducing the power consumption of the switching power supply. In addition, the signal transmission circuit utilizes a pin that is originally used by the synchronous rectifier chip to set a criterion for turning on the synchronous rectifier power tube, and no additional chip pin is needed.

BRIEF DESCRIPTION OF THE DRAWINGS

To describe the technical solutions in the embodiments of the present application more clearly, the following briefly describes the prior art and the accompanying drawings that need to be used in the embodiments. It is obvious that the accompanying drawings in the following descriptions merely show some of the embodiments of the present application, and a person of ordinary skill in the art can obtain other drawings from these accompanying drawings without involving inventive skill.

To describe the technical solutions in the embodiments of the present application more clearly, the following briefly describes the prior art and the accompanying drawings that need to be used in the embodiments. It is obvious that the accompanying drawings in the following descriptions merely show some of the embodiments of the present application, and a person of ordinary skill in the art can obtain other drawings from these accompanying drawings without involving inventive skill.

DETAILED DESCRIPTION OF SPECIFIC EMBODIMENTS

The core of the present application is to provide a switching power supply, a synchronous rectifier chip, and a protocol chip. A signal transmission circuit is established to implement communication between a synchronous rectifier circuit and a protocol circuit, so that the working mode of the synchronous rectifier circuit can be adjusted, switched, or controlled according to the power supply demand of a load device detected by the protocol circuit, thus improving communication between chips of the switching power supply, and further reducing the power consumption of the switching power supply.

To render the objectives, technical solutions, and advantages of the embodiments of the present application clearer, the following clearly and completely describes the technical solutions in the embodiments of the present application with reference to the accompanying drawings in the embodiments of the present application. It is clear that the described embodiments are merely some rather than all of the embodiments of the present application. All other embodiments obtained by a person of ordinary skill in the art based on the embodiments of the present application without involving inventive skill fall within the scope of protection of the present application.

Currently, there is no communication between a synchronous rectifier circuit 11 and a protocol circuit 12 in the prior art. The on-state of a synchronous rectifier tube in the synchronous rectifier circuit 11 is adjusted according to the load connected to the protocol circuit 12, resulting in poor intelligence of the switching power supply and high power consumption.

Figure 1:
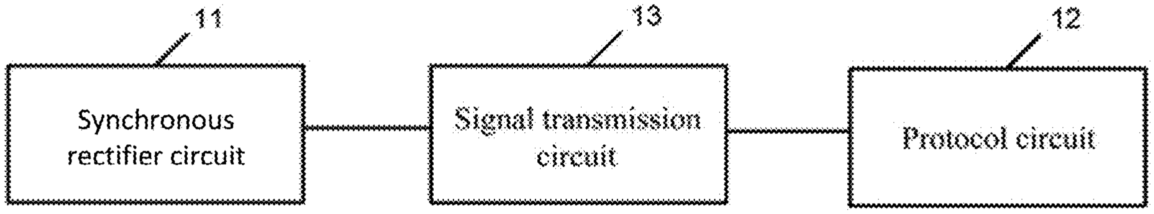
FIG. 1 is a structural block diagram of a switching power supply according to certain embodiments of the present application.

To resolve the above technical problem, the present application provides a switching power supply. FIG. 1 is a structural block diagram of the switching power supply according to the present application. The switching power supply includes: a protocol circuit 12 disposed on a secondary side of the switching power supply and configured to detect the power supply demand of a load device; a synchronous rectifier circuit 11 disposed on the secondary side of the switching power supply and configured to control a rectifier power tube; and a signal transmission circuit 13 disposed between the protocol circuit 12 and the synchronous rectifier circuit 11 and configured to transmit a signal.

In the prior art, there is no communication between the synchronous rectifier circuit 11 and the protocol circuit 12. Therefore, the working mode of the synchronous rectifier chip cannot be adjusted according to the load, resulting in no information exchange between two chips, and standby power consumption of the switching power supply cannot be reduced.

The present invention is intended to provide a switching power supply having ultra-low standby power consumption. The protocol circuit 12 is disposed on a secondary side to detect the power supply demand of the load device, and relevant information is transmitted to the synchronous rectifier circuit 11 via the signal transmission circuit 13, so that the working mode of the synchronous rectifier circuit 11 is adjusted, to thereby achieve an energy saving and consumption reducing effect.

Specifically, in the present embodiment, three parts, namely the protocol circuit 12, the synchronous rectifier circuit 11, and the signal transmission circuit 13, are combined for effective connection, so as to implement optimal control of an intelligent switching power supply. The protocol circuit 12 detects the power supply demand of the load device and transmits information to the synchronous rectifier circuit 11 via the signal transmission circuit 13, to implement adjustment of the working mode of the synchronous rectifier circuit 11. The key to the present invention is to implement intelligent control of the power supply demand of the load device by the synchronous rectifier circuit 11 by using the protocol circuit 12 and the signal transmission circuit 13. When the power supply demand of the load device changes, the protocol circuit 12 detects the change and transmits information to the signal transmission circuit 13, and the signal transmission circuit 13 then transmits the information to the synchronous rectifier circuit 11. In the synchronous rectifier circuit 11, the working mode of the synchronous rectifier circuit 11 is adjusted according to the received information, so that energy utilization efficiency is optimized, thereby achieving an energy saving and consumption reducing effect.

A specific implementation of the present embodiment is as follows. The protocol circuit 12 is disposed on the secondary side of the switching power supply, and the protocol circuit 12 and the synchronous rectifier circuit 11 are connected via the signal transmission circuit 13. The protocol circuit 12 detects the power supply demand of the load device and transmits information to the synchronous rectifier circuit 11 via the signal transmission circuit 13, implementing adjustment of the working mode. Therefore, intelligent control of the synchronous rectifier circuit and the entire switching power supply can be implemented under different loads, thereby optimizing energy utilization efficiency and achieving an energy saving and consumption reducing effect.

In a specific embodiment, when the protocol circuit 12 detects that a load device is connected, a first signal is transmitted to the synchronous rectifier circuit 11 via the signal transmission circuit 13. When the synchronous rectifier circuit 11 detects the first signal, the switching power supply adjusts the mode thereof to a burst mode. When the protocol circuit 12 detects that the load is not connected, a second signal is transmitted to the synchronous rectifier circuit 11 via the signal transmission circuit 13. When the synchronous rectifier circuit 11 detects the second signal, the switching power supply adjusts the mode thereof to a sleep mode. The first signal and the second signal may be two different-level signals. Of course, the switching power supply also has a normal working work mode. It can be understood that the above sleep mode is a super standby state of the synchronous rectifier circuit 11. As such, most energy-consuming modules are turned off to implement zero milliwatt standby.

In summary, in the present embodiment, a brand new information transmission channel is formed by adding the protocol circuit 12 to the secondary side of the switching power supply and by connecting the protocol circuit 12 to the synchronous rectifier circuit 11 via the signal transmission circuit 13, which can implement the intelligent control of the synchronous rectifier circuit and the entire switching power supply, thus improving the energy utilization efficiency of the switching power supply, achieving an energy saving and consumption reducing effect, and providing great practicality and economic benefits.

Figure 2:
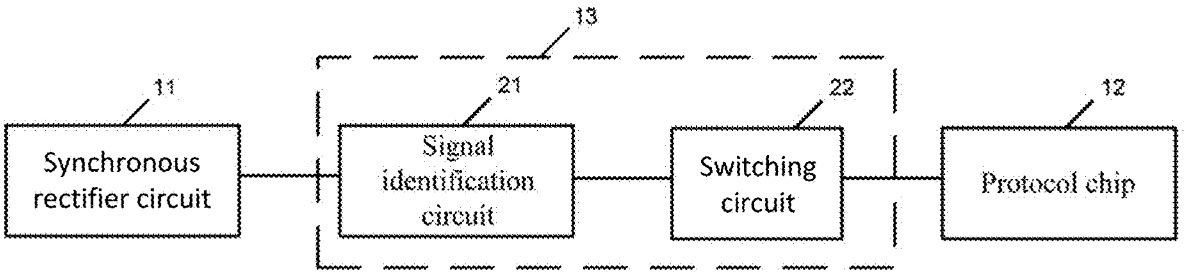
FIG. 2 is a specific structural block diagram of a switching power supply according to certain embodiments of the present application.

FIG. 2 is a specific structural block diagram of a switching power supply according to the present application.

As a preferred embodiment, the signal transmission circuit 13 includes a switching circuit 22 and a signal identification circuit 21. An input terminal of the switching circuit 22 is connected to the protocol circuit 12, an output terminal of the switching circuit 22 is connected to an input terminal of the signal identification circuit 21, and an output terminal of the signal identification circuit 21 is connected to the synchronous rectifier circuit 11.

The switching circuit 22 is configured to adjust the switching state of the switching circuit 22 according to a detection result outputted by the protocol circuit 12, so as to output a power supply demand signal.

The signal identification circuit 21 is configured to output a control signal to the synchronous rectifier circuit 11 according to the power supply demand signal outputted by the switching circuit 22, to adjust the working mode of the synchronous rectifier circuit 11.

Specifically, in the above embodiment, adding the signal transmission circuit 13 between the protocol circuit 12 and the synchronous rectifier circuit 11 is proposed. In the present embodiment, the signal transmission circuit 13 implements communication between the protocol circuit 12 and the synchronous rectifier circuit 11 via the switching circuit 22 and the signal identification circuit 21.

Specifically, in the present embodiment, the protocol circuit 12 transmits the power supply demand signal to the switching circuit 22 by detecting the power supply demand of the load device. The switching circuit 22 receives the power supply demand signal and outputs the power supply demand signal by adjusting the switching state. The signal identification circuit 21 receives the power supply demand signal, converts the power supply demand signal into a control signal, and transmits the control signal to the synchronous rectifier circuit 11. The synchronous rectifier circuit 11 adjusts the working mode thereof according to the control signal, to thereby implement intelligent control.

In summary, in the present embodiment, the signal transmission circuit 13 is added, so that communication is performed between the protocol circuit 12 and the synchronous rectifier circuit 11, thereby improving the degree of intelligence of the switching power supply. In addition, because the synchronous rectifier circuit 11 can adjust the working mode thereof according to the load, energy can thereby be further saved, and power consumption can be reduced.

Figure 3:
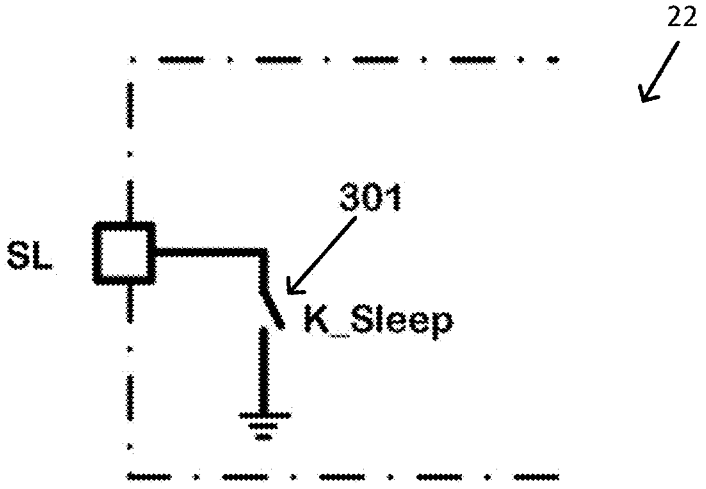
FIG. 3 is a schematic diagram of a switching circuit according to certain embodiments of the present application.

FIG. 3 is a schematic diagram of a switching circuit 22 according to the present application.

As a preferred embodiment, the switching circuit 22 includes a controllable switching transistor 301. A control terminal of the controllable switching transistor 301 is an input terminal of the switching circuit 22. An output terminal of the controllable switching transistor 301 is an output terminal (labeled as "SL" in FIG. 3) of the switching circuit 22.

Specifically, to reduce costs for the switching circuit 22, the controllable switching transistor 301 may be chosen as a specific implementation of the switching circuit 22, such as a metal-oxide-semiconductor (MOS) transistor or a triode, which will not be further defined by the present application herein. The controllable switching transistor 301 usually at least includes one control terminal (e.g., the control terminal of the controllable switching transistor 301 is not shown in FIG. 3), and the protocol circuit 12 specifically adjusts, according to the connection state of the load, the working state of the controllable switching transistor 301 via the control terminal (specifically, the working state of the controllable switching transistor 301 may be adjusted by a driving voltage of the control terminal of the controllable switching transistor 301).

As a preferred embodiment, when the controllable switching transistor 301 is an n-type metal-oxide-semiconductor (NMOS) transistor, a gate of the NMOS transistor is the control terminal of the controllable switching transistor 301, a source of the NMOS transistor is the output terminal of the controllable switching transistor 301, and a drain of the NMOS transistor is grounded.

In a specific embodiment, the controllable switching transistor 301 may be an NMOS transistor. As such, the protocol circuit 12 adjusts the on/off state of the NMOS transistor via the gate of the NMOS transistor. Specifically, when the gate of the NMOS transistor receives a high-level signal, the gate controls the NMOS transistor to be turned on. Otherwise, the gate controls the NMOS transistor to be turned off. Correspondingly, when the drain of the NMOS transistor is grounded, if the NMOS transistor is turned on, the output terminal of the controllable switching transistor 301 outputs a low level. Otherwise, the output terminal of the controllable switching transistor 301 outputs a high level. As a specific implementation of the controllable switching transistor 301, the NMOS transistor has low costs and is easy to implement.

Figure 4:
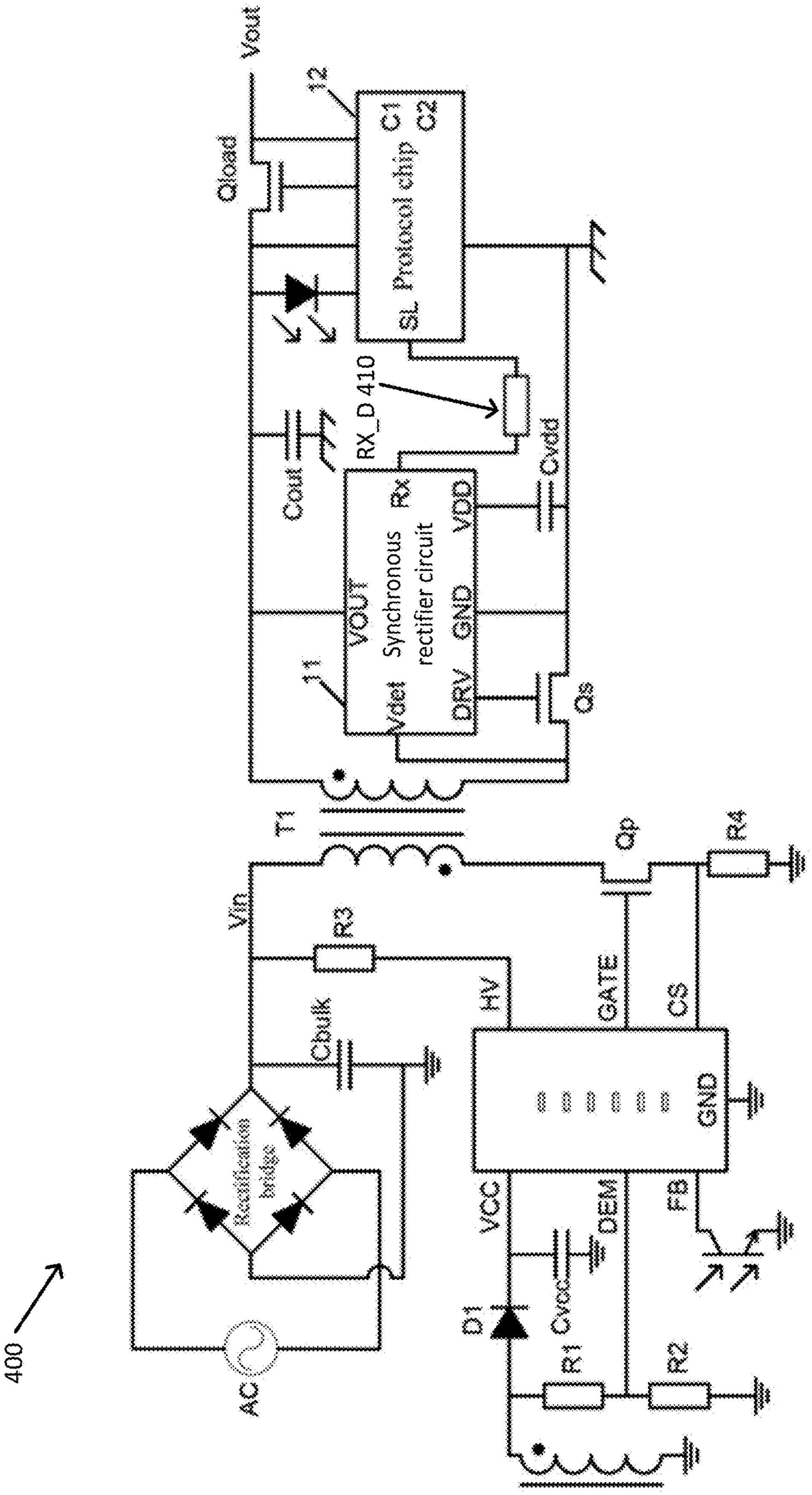
FIG. 4 is a schematic diagram of a specific circuit of a switching power supply according to certain embodiments of the present application.

FIG. 4 is a schematic diagram of a specific circuit of a switching power supply 400 according to the present application.

As a preferred embodiment, an impedance component (e.g., the impedance component RX_D 410 shown in FIG. 4) is also disposed between the switching circuit 22 shown in FIG. 2 and the signal identification circuit 21 shown in FIG. 2, and is configured to set a criterion for turning on a rectifier power tube.

Furthermore, when the switching circuit 22 and the signal identification circuit 21 are directly connected, if the output terminal of the switching circuit 22 is suspended, the input terminal of the signal identification circuit 21 is in a suspended state. Therefore, to prevent the input terminal of the signal identification circuit 21 from being in a suspended state, in the present embodiment, the impedance component is also disposed between the two ends, wherein the impedance component may be a resistor, such as an adjustable resistor, for setting the criterion for turning on the rectifier power tube.

As a preferred embodiment, when the power supply demand signal is a voltage signal or a current signal, the signal identification circuit 21 includes a comparison circuit.

A first input terminal of the comparison circuit is connected to the output terminal of the switching circuit 22, a second input terminal of the comparison circuit is connected to a reference voltage output device or a reference current output device, and an output terminal of the comparison circuit is connected to the synchronous rectifier circuit 11.

The comparison circuit is configured to compare the voltage at the output terminal of the switching circuit 22 with a reference voltage or compare the current at the output terminal of the switching circuit 22 with a reference current, and output the control signal to the synchronous rectifier circuit 11 according to a comparison result, thus adjusting the working mode of the synchronous rectifier circuit 11.

Specifically, a specific implementation of the signal identification circuit 21 is based on the comparison circuit, and a control signal is outputted to the synchronous rectifier circuit 11 by comparing the difference between a signal outputted by the switching circuit 22 and the reference voltage or current, thus adjusting the working mode of the synchronous rectifier circuit 11.

In actual circuit design, a plurality of devices such as an operational amplifier, an analog-to-digital converter, and a digital signal processor may be used for implementation, to improve the accuracy and stability of detection.

Figure 5:
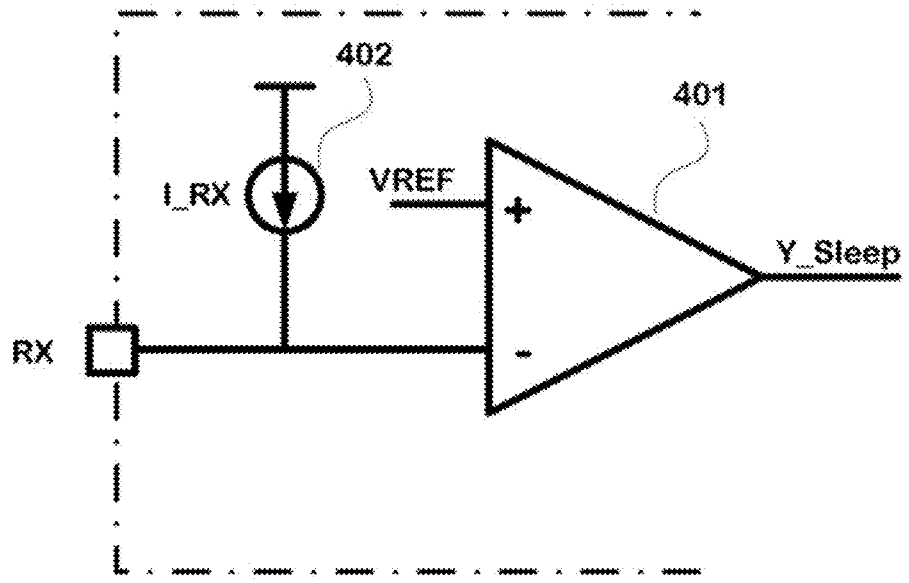
FIG. 5 is a schematic diagram of a signal identification circuit according to certain embodiments of the present application.

As a preferred embodiment, the comparison circuit is a comparator 401 shown in FIG. 5, a first input terminal of the comparator 401 shown in FIG. 5 is the first input terminal of the comparison circuit, a second input terminal of the comparator 401 shown in FIG. 5 is the second input terminal of the comparison circuit, and an output terminal of the comparator 401 shown in FIG. 5 is the output terminal of the comparison circuit.

Specifically, the principle of the comparison circuit is to compare two input signals and output a control signal according to a comparison result. In the switching power supply, the comparison circuit is configured to compare the magnitude relationship between a voltage or current at the output terminal of the switching circuit 22 and the reference voltage or current, to adjust the working mode of the synchronous rectifier circuit 11.

Figure 6:
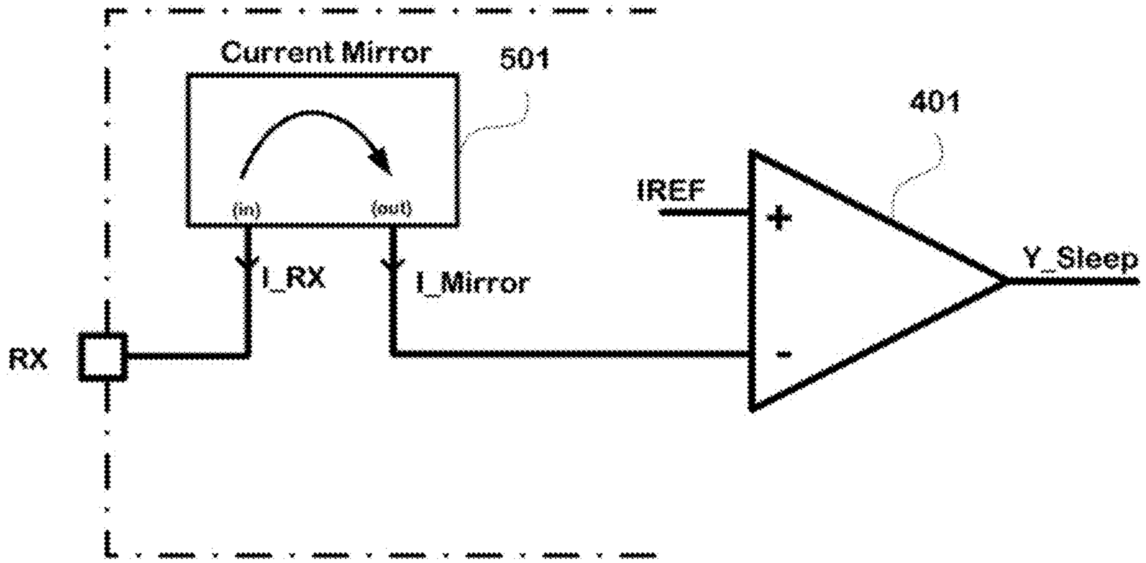
FIG. 6 is a schematic diagram of another signal identification circuit according to certain embodiments of the present application.

Therefore, a specific implementation of the comparison circuit may be the comparator 401 shown in FIG. 5 or FIG. 6. As such, the second input terminal inputs the reference voltage or reference current. When the second input terminal of the comparator 401 shown in FIG. 5 inputs the reference voltage, a voltage inputted to the first input terminal is compared with the reference voltage. When the voltage at the first input terminal is greater than the reference voltage, a first level is outputted. When the voltage at the first input terminal is less than the reference voltage, a second level is outputted. When the reference current is inputted to the second input terminal of the comparator 401 shown in FIG. 6, a current inputted to the first input terminal is compared with the reference current. When the current at the first input terminal is greater than the reference current, the first level is outputted. When the current at the first input terminal is less than the reference current, the second level is outputted. The first level is opposite to the second level.

In this manner, it can be determined, according to an output signal of the switching circuit 22, whether the switching circuit 22 meets an expected level, thereby adjusting the working mode of the synchronous rectifier circuit 11.

In addition to the basic comparator 401, the comparison circuit may also be expanded and implemented by adding a reference circuit, a filter circuit, and the like. In addition, digital signal processing technology may also be used to further process the comparison result to achieve a more precise and reliable control effect, which will not be further defined by the present application herein.

FIG. 5 is a schematic diagram of a signal identification circuit according to the present application.

As a preferred embodiment, the comparison circuit further includes a current source 402 shown in FIG. 5.

The first input terminal of the comparison circuit is further connected to the current source 402, and the second input terminal of the comparison circuit is connected to a reference voltage output device.

The comparison circuit is specifically configured to compare the voltage at the output terminal of the switching circuit 22 shown in FIG. 2 with a reference voltage, and output the control signal to the synchronous rectifier circuit 11 shown in FIG. 2 according to the comparison result, thus adjusting the working mode of the synchronous rectifier circuit 11.

In the design of the switching power supply, the voltage or current needs to be compared, to adjust the working mode of the synchronous rectifier circuit 11. For a technical solution for implementing comparison, in conventional methods, a resistor voltage divider or an operational amplifier is used. However, these methods have problems such as low precision, loud noise, and large temperature drift, which affect the entire performance of the switching power supply.

To resolve the above problem, the current source 402 is used in the comparison circuit to implement comparison, that is, a voltage and current that are compared are converted into a current for comparison. In this way, comparison accuracy can be increased, and the impact of noise and temperature drift on the comparison result can be reduced.

The function of the current source 402 is to convert a compared object into a current, compare different current values to determine which one is larger, and thereby output a corresponding control signal. A specific implementation is usually to apply a power supply voltage to a constant current source, and then connect in series the voltage or current to be compared to the constant current source. A corresponding comparison voltage or current can be obtained according to Ohm's law.

Specifically, reference can be made to FIG. 5. The comparison circuit includes the current source 402. The first input terminal of the comparator 401 is a negative input terminal and is connected to the output terminal of the current source 402, Rx (i.e., the input terminal of the signal identification circuit 21) is connected to a resistor RX_D, the second input terminal of the comparator 401 is connected to the reference voltage output device, the reference voltage is VREF, a current outputted by the current source 402 is I_RX, and the comparison result of the comparator 401 is Y_Sleep.

A current I_RX outputted by an internal current source 402 is outputted from a first preset pin RX, passes through an external resistor RX_D of the synchronous rectifier circuit 11, and then passes through a controllable switching transistor 301 K_Sleep connected to the protocol circuit 12 to the ground. When the voltage of the Rx pin is greater than VREF, the synchronous rectifier circuit 11 is controlled, so that the synchronous rectifier circuit 11 enters the sleep mode. When the voltage of the Rx pin is less than VREF, the synchronous rectifier circuit 11 is controlled, so that the synchronous rectifier circuit 11 exits the sleep mode and is in a normal working mode.

In a specific embodiment, to ensure the reliability of the working mode in which the synchronous rectifier circuit 11 is being adjusted, the following may be performed: the synchronous rectifier circuit 11 adjusts the working mode thereof only after detecting a change in the control signal for a preset time. In the present embodiment, after it is detected that the voltage of the Rx pin is greater than VREF for a preset time, the synchronous rectifier circuit 11 is controlled, so that the synchronous rectifier circuit 11 enters the sleep mode. When the voltage of the Rx pin is less than VREF for a preset time, the synchronous rectifier circuit is controlled, so that the synchronous rectifier circuit 11 exits the sleep mode and enters the normal working mode.

By means of the described preset time delay, it can be ensured that the synchronous rectifier circuit 11 reliably adjusts the working mode, and the synchronous rectifier circuit 11 frequently switching the working mode due to external interference is prevented.

FIG. 6 is a schematic diagram of another signal identification circuit according to the present application.

As a preferred embodiment, the comparison circuit further includes a current mirror 501.

An input terminal of the current mirror 501 is connected to the output terminal of the switching circuit 22, an output terminal of the current mirror 501 is connected to the first input terminal of the comparison circuit, the second input terminal of the comparison circuit is connected to the reference current output device, and the current mirror 501 is pre-configured with a preset ratio.

The comparison circuit is specifically configured to compare the current at the output terminal of the switching circuit 22 with the reference current, and output the control signal to the synchronous rectifier circuit 11 according to the comparison result, thus adjusting the working mode of the synchronous rectifier circuit.

Considering that when a conventional comparison circuit uses a resistor as a current source 402, the stability and accuracy of the current source 402 are affected by factors such as the temperature, resulting in a comparison error and an inaccurate outputted control signal.

In the present embodiment, the current mirror 501 is used as the current source 402 in the comparison circuit, which improves the stability and accuracy of the current source 402, thereby improving comparison accuracy and control accuracy. The current mirror 501 is a current source 402 circuit based on a MOSFET transistor, which has extremely high accuracy and stability and can achieve, by adjusting the mirror ratio, a required outputted current.

Specifically, reference can be made to FIG. 6. FIG. 6 is a schematic diagram of a specific implementation of a comparison circuit according to the present application. In FIG. 6, the comparison circuit includes the current mirror 501. The first input terminal of the comparator 401 is a negative input terminal and is connected to the output terminal of the current mirror 501. Rx (the input terminal of the signal identification circuit 21) is connected to the input terminal of the current mirror 501, Rx is also connected to a resistor RX_D, the second input terminal of the comparator 401 is connected to the reference current output device, the reference current is IREF, an input current of the current mirror 501 is I_RX, an output current of the current mirror 501 is I_Mirror, a preset ratio is formed between I_Mirror and I_RX, and the comparison result of the comparator 401 is Y_Sleep.

RX is connected to a peripheral impedance device (RX_D), detects the current I_RX at the RX pin, and converts the current according to the preset ratio via the current mirror 501 and then outputs I_Mirror. When the I_Mirror current is less than IREF, the comparison circuit enters a sleep mode. When the I_Mirror current is greater than IREF, the comparison circuit exits the sleep mode and enters a normal working mode.

Similarly, after it is detected that the I_Mirror current is less than IREF for a preset time, the comparison circuit enters the sleep mode. After it is detected that the I_Mirror current is greater than IREF for a preset time, the comparison circuit exits the sleep mode and enters the normal working mode.

By means of the described preset time delay, it can be ensured that the synchronous rectifier circuit 11 reliably adjusts the working mode, and the synchronous rectifier circuit 11 frequently switching the working mode due to external interference is prevented.

To resolve the above technical problem, the present application further provides a synchronous rectifier chip.

Figure 7:
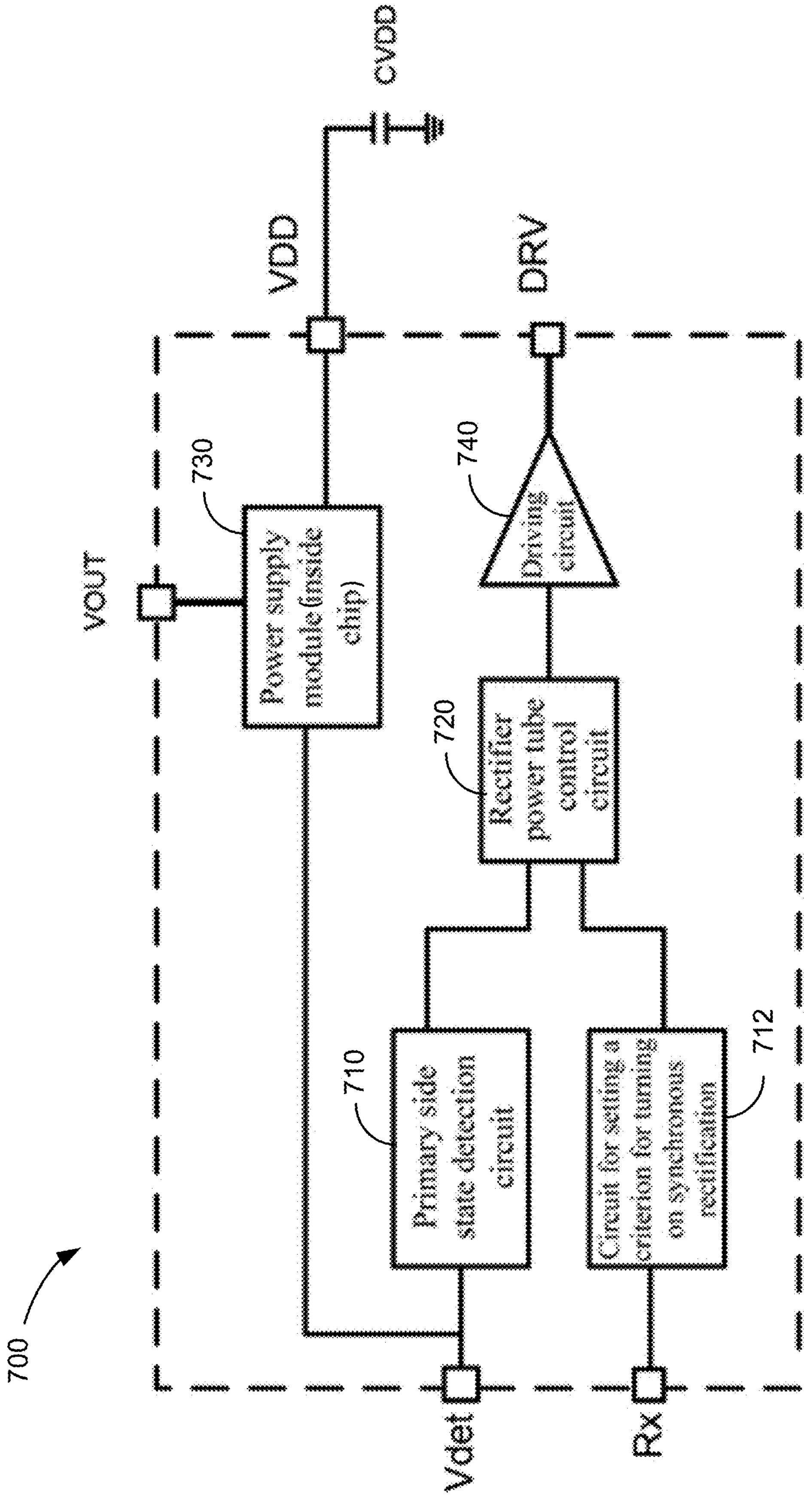
FIG. 7 (prior art)
FIG. 7 is a schematic diagram of a synchronous rectifier chip in the prior art.
Figure 8:
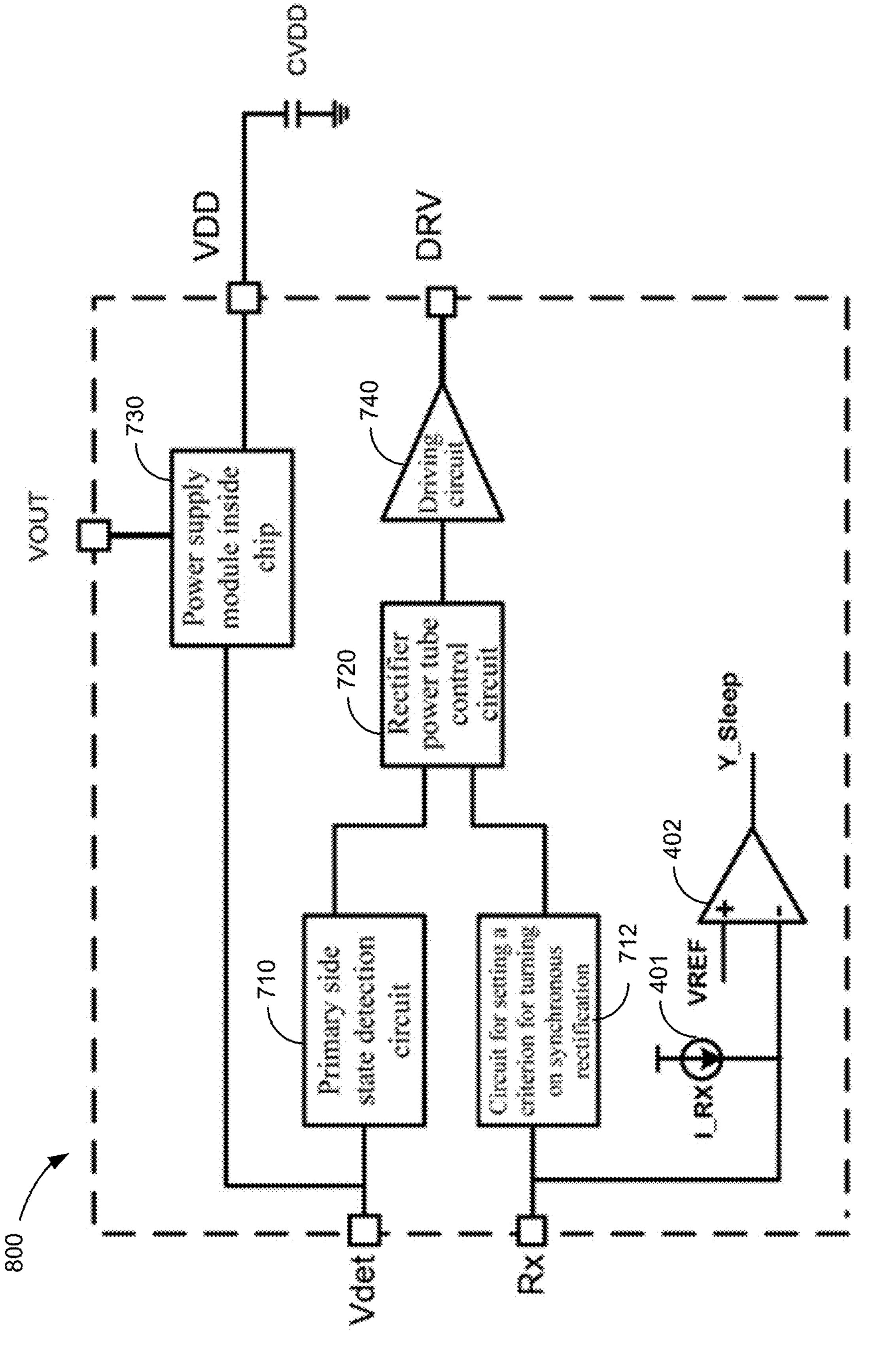
FIG. 8 is a schematic diagram of a synchronous rectifier chip according to certain embodiments of the present application.

FIG. 7 is a schematic diagram of a synchronous rectifier chip 700 in the prior art. FIG. 8 is a schematic diagram of a synchronous rectifier chip 800 according to the present application. The synchronous rectifier chip shown in FIG. 7 includes a power supply module 730 (inside the chip), which is configured to convert a primary output Vdet into VOUT and VDD. A primary side state detection circuit 710 is configured to detect a primary side output state and output a result to a rectifier power tube control circuit 720 to affect the turning on and turning off of a rectifier power tube. Rx is a receiving pin. In the prior art, a threshold is set by a circuit for setting a criterion for turning on synchronous rectification 712. When an input value at the Rx pin reaches the threshold, a rectifier power tube is triggered to turn on. The rectifier power tube control circuit 720 is connected to a driving circuit 740.

The synchronous rectifier chip 800, as shown in FIG. 8, provided in the present application is used in a secondary side of a switching power supply that comprises a protocol chip. The synchronous rectifier chip 800 shown in FIG. 8 is one implementation example of the synchronous rectifier circuit 11 shown in FIG. 1. The synchronous rectifier chip 800 includes: a control pin DRV, configured to control the turning on and turning off of a rectifier power tube according to an input signal; and a receiving pin Rx, connected to the protocol chip and configured to receive a power supply demand signal representing a switching power supply load device and adjust the working mode of the synchronous rectifier chip.

As a preferred embodiment, the synchronous rectifier chip 800 further includes a signal identification circuit 21 shown in FIG. 2.

The signal identification circuit 21 is configured to identify the received power supply demand signal and adjust the working mode of the synchronous rectifier chip according to the power supply demand signal.

As a preferred embodiment, when the power supply demand signal is a voltage signal or a current signal, the signal identification circuit 21 includes a comparison circuit.

A first input terminal of the comparison circuit is connected to the output terminal of the switching circuit 22, a second input terminal of the comparison circuit is connected to a reference voltage output device or a reference current output device, and an output terminal of the comparison circuit is connected to the control pin DRV.

The comparison circuit is configured to compare the voltage at the output terminal of the switching circuit 22 with a reference voltage or compare the current at the output terminal of the switching circuit 22 with a reference current, and output the control signal to the synchronous rectifier circuit 11 according to a comparison result, thus adjusting the working mode of the synchronous rectifier chip.

As a preferred embodiment, the comparison circuit is a comparator 401, a first input terminal of the comparator 401 is the first input terminal of the comparison circuit, a second input terminal of the comparator 401 is the second input terminal of the comparison circuit, and an output terminal of the comparator 401 is the output terminal of the comparison circuit.

As a preferred embodiment, the comparison circuit further includes a current source 402.

The first input terminal of the comparison circuit is further connected to the current source 402, and the second input terminal of the comparison circuit is connected to the reference voltage output device.

The comparison circuit is configured to compare the voltage at the output terminal of the switching circuit 22 with the reference voltage, and output a control signal to the control pin DRV according to the comparison result, thus adjusting the working mode of the synchronous rectifier chip.

As a preferred embodiment, the comparison circuit further includes a current mirror 501 shown in FIG. 6.

An input terminal of the current mirror 501 is connected to the output terminal of the switching circuit 22, an output terminal of the current mirror 501 is connected to the first input terminal of the comparison circuit, the second input terminal of the comparison circuit is connected to the reference current output device, and the current mirror 501 is pre-configured with a preset ratio.

The comparison circuit is specifically configured to compare the current at the output terminal of the switching circuit 22 with the reference current, and output the control signal to the control pin DRV according to the comparison result, thus adjusting the working mode of the synchronous rectifier chip.

The pin of the synchronous rectifier chip is the same as a pin in the prior art, both of which may be pins for setting a criterion for turning on a rectifier power tube. That is, in the present embodiment, an original Rx pin is reused, and no additional chip pin is needed. The difference is that the signal identification circuit 21 connected to the Rx pin is disposed inside the synchronous rectifier chip. Devices such as the comparator and the current source required for the signal identification circuit 21 may be other reused idle components inside the synchronous rectifier chip, which will not be further defined by the present application herein.

For other descriptions of the synchronous rectifier chip, please refer to the above embodiment, which is not described again in the present application.

Figure 9:
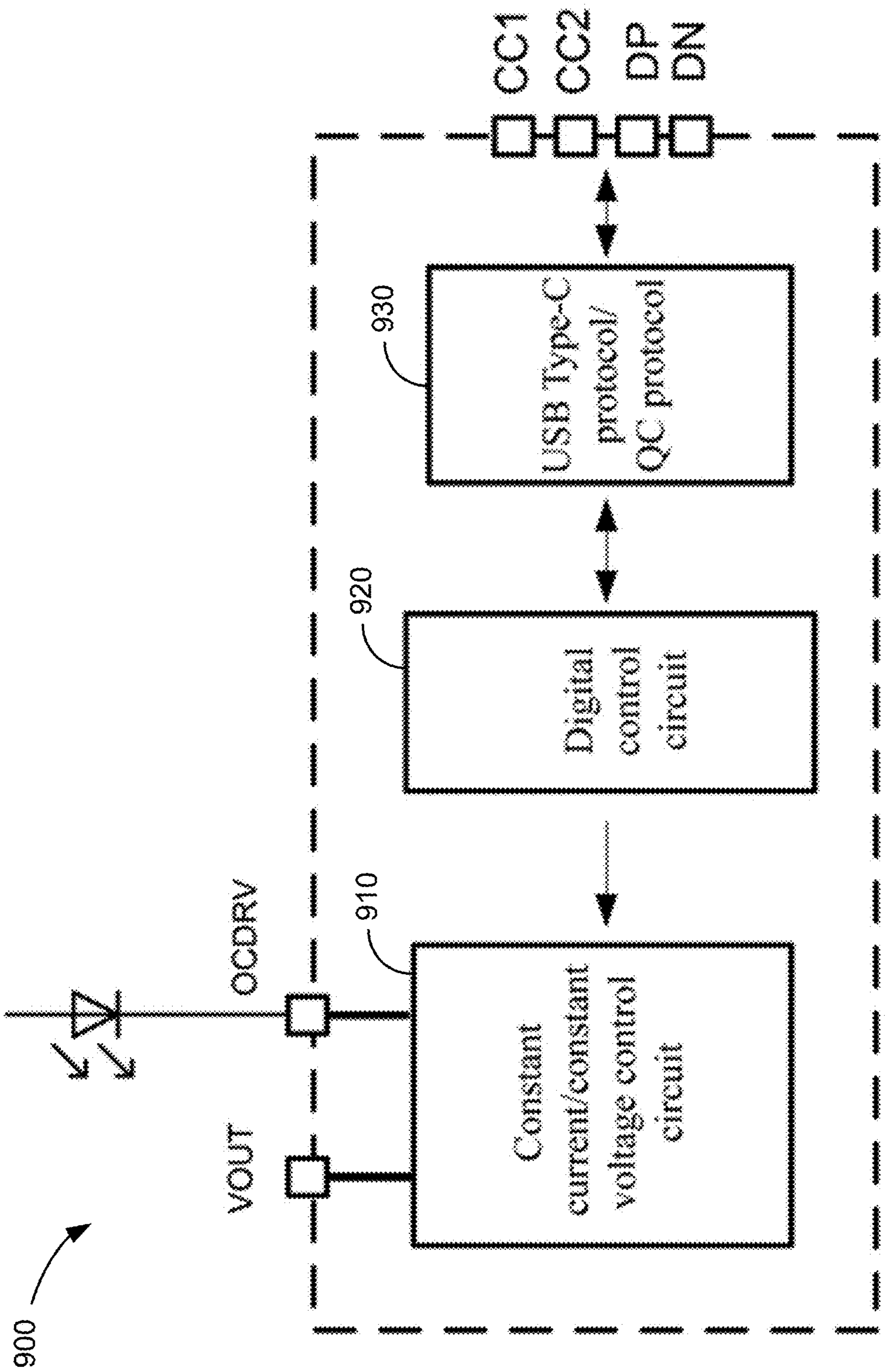
FIG. 9 (prior art)
FIG. 9 is a schematic diagram of a protocol chip in the prior art.
Figure 10:
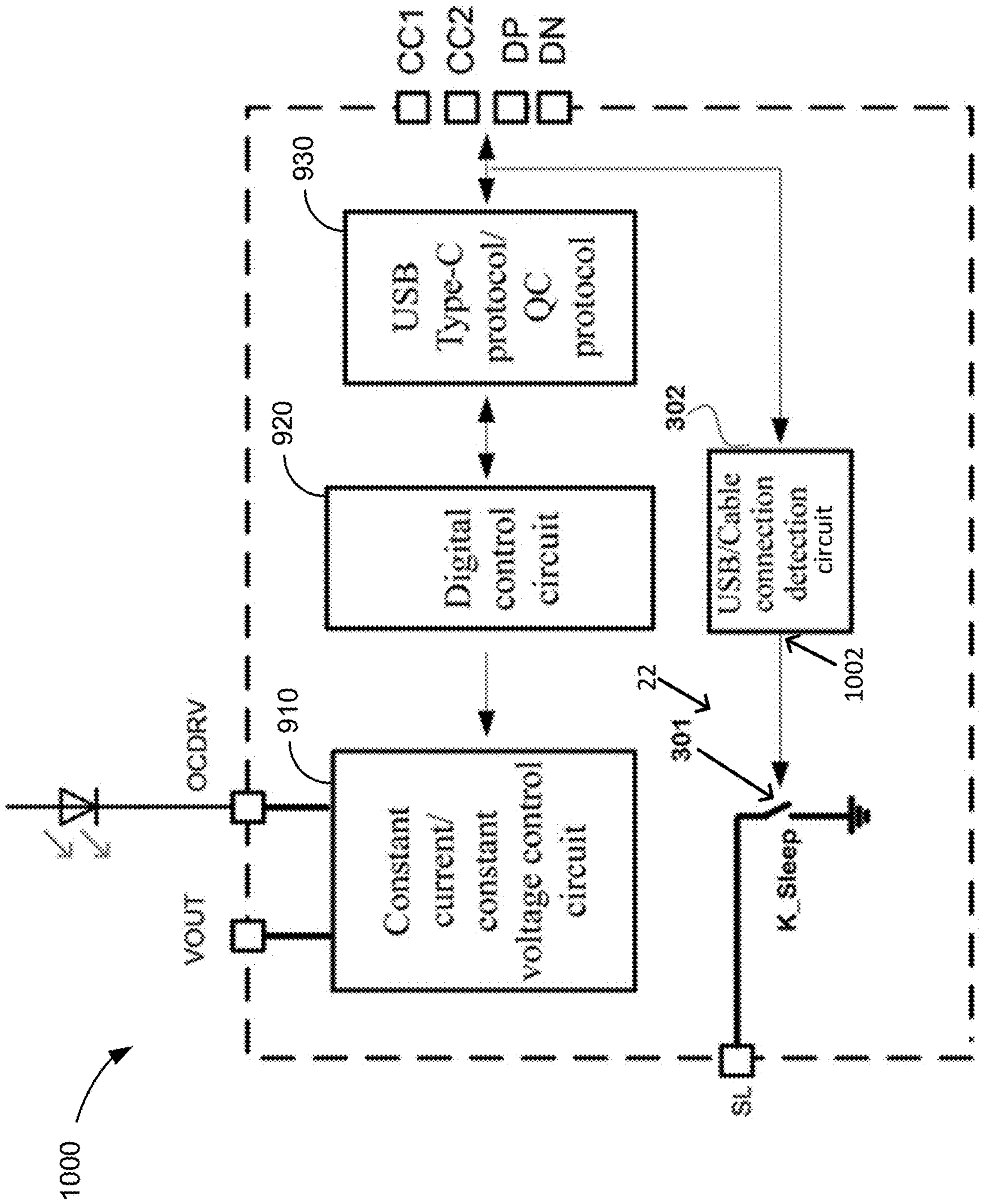
FIG. 10 is a schematic diagram of a protocol chip according to certain embodiments of the present application.

To resolve the above technical problem, the present application further provides a protocol chip. FIG. 9 is a schematic diagram of a protocol chip 900 in the prior art. FIG. 10 is a schematic diagram of a protocol chip 1000 according to the present application.

A protocol chip 900 in the prior art includes the following parts: a constant current and constant voltage control circuit (may also be referred to as a constant current/constant voltage control circuit) 910, configured to control the stability of the output voltage and the output current, to ensure that the output voltage and the output current are always within a designed range; a digital control circuit 920, which communicates with a power manager, sends control signals to the power manager according to different input voltage, output voltage, and current requirements, and adjusts the output voltage and current, to implement power control and management; a USB type-C protocol/QC protocol 930, which supports a plurality of fast charging protocols and controls the output voltage and current according to different protocols, to implement fast charging and device protection; and a plurality of pins, wherein a VOUT pin is a output voltage control pin, and an output voltage level is fed back to the control circuit via the pin for voltage control; an OCDRV pin is an optocoupler drive pin, and is configured to transmit secondary-side load information of a switching power supply to a primary-side control chip, to implement output control of a power supply; a CC1/CC2 pin is configured for signal transmission and device identification in a Type C interface, and a device type and requirement are identified via a CC signal line for protocol matching and fast charging control; and a DP/DN pin is configured for high-speed data transfer in the Type C interface.

The protocol chip 1000, as shown in FIG. 10, in the present application is used in a secondary side of a switching power supply provided with a synchronous rectifier chip. The protocol chip 1000 includes: a detection pin (labeled as "DP" in FIG. 10), configured to detect the power supply demand of a load device; and an output pin (labeled as "SL" in FIG. 10), configured to transmit a power supply demand signal to the synchronous rectification chip, to adjust the working mode of the synchronous rectifier chip.

As a preferred embodiment, the protocol chip 1000 further includes a switching circuit 22 shown in FIG. 3 and a detection circuit 302.

An input terminal of the switching circuit 22 is connected to an output terminal 1002 of the detection circuit 302, and an output terminal of the switching circuit 22 is connected to the output pin SL.

The switching circuit 22 is configured to adjust the switching state thereof according to a detection result outputted by the detection circuit 302, so as to output the power supply demand signal via the output pin SL.

As a preferred embodiment, the switching circuit 22 includes a controllable switching transistor 301. A control terminal of the controllable switching transistor 301 is connected to the detection pin (labeled as "DP" in FIG. 10), and an output terminal of the controllable switching transistor 301 is connected to the output pin SL.

The protocol chip 1000 in the present application reuses the output pin SL and detects, via a USB/Cable connection detection circuit 302, whether the load is connected, thereby outputting a control signal to control the controllable switching transistor 301, so that the SL pin outputs the power supply demand signal.

For other descriptions of the protocol chip, please refer to the above embodiment, which is not described again in the present application.

To resolve the above technical problem, the present application further provides a switching power supply, including: the above protocol chip; and the above synchronous rectifier chip.

As a preferred embodiment, an impedance component is disposed between the output pin SL of the protocol chip and the receiving pin Rx of the synchronous rectifier chip, that is, the synchronous rectifier chip also utilizes a pin Rx that is originally configured to set a criterion for turning on a rectifier power tube, and an additional chip pin is not required.

For other descriptions of the switching power supply, please refer to the above embodiment, which is not described again in the present application.

In accordance with one aspect of the present application, a switching power supply is provided. The switching power supply may include: a protocol circuit disposed on a secondary side of the switching power supply and configured to detect a power supply demand of a load device connected to the protocol circuit; a synchronous rectifier circuit disposed on the secondary side of the switching power supply and configured to control a rectifier power tube; and a signal transmission circuit disposed between the protocol circuit and the synchronous rectifier circuit and configured to transmit a signal between the protocol circuit and the synchronous rectifier circuit.

Implementations may include one or more of the following features. In some embodiments, the signal transmission circuit may include a switching circuit and a signal identification circuit; where an input terminal of the switching circuit is connected to the protocol circuit, an output terminal of the switching circuit is connected to an input terminal of the signal identification circuit, and an output terminal of the signal identification circuit is connected to the synchronous rectifier circuit; where the switching circuit is configured to adjust a switching state of the switching circuit, according to a detection result outputted by the protocol circuit, to output a power supply demand signal; and where the signal identification circuit is configured to output a control signal received by the synchronous rectifier circuit, according to the power supply demand signal outputted by the switching circuit, to adjust a working mode of the synchronous rectifier circuit.

In some embodiments, the switching circuit may include a controllable switching transistor, a control terminal of the controllable switching transistor is the input terminal of the switching circuit, and an output terminal of the controllable switching transistor is the output terminal of the switching circuit.

In some embodiments, when the controllable switching transistor is an n-type metal-oxide-semiconductor (NMOS) transistor, a gate of the NMOS transistor is the control terminal of the controllable switching transistor, a source of the NMOS transistor is the output terminal of the controllable switching transistor, and a drain of the NMOS transistor is grounded.

In some embodiments, an impedance component is disposed between the switching circuit and the signal identification circuit.

In some embodiments, when the power supply demand signal is a voltage signal or a current signal, the signal identification circuit may include a comparison circuit; where a first input terminal of the comparison circuit is connected to the output terminal of the switching circuit, a second input terminal of the comparison circuit is connected to a reference voltage output device or a reference current output device, and an output terminal of the comparison circuit is connected to the synchronous rectifier circuit; and where the comparison circuit is configured to compare a voltage at the output terminal of the switching circuit with a reference voltage or compare a current at the output terminal of the switching circuit with a reference current, and output the control signal to the synchronous rectifier circuit according to a comparison result, thus adjusting the working mode of the synchronous rectifier circuit.

In some embodiments, the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

In some embodiments, the comparison circuit further may include a current source; where the first input terminal of the comparison circuit is connected to the current source, and the second input terminal of the comparison circuit is connected to the reference voltage output device; and where the comparison circuit is configured to compare the voltage at the output terminal of the switching circuit with the reference voltage, and output the control signal received by the synchronous rectifier circuit, according to the comparison result, thus adjusting the working mode of the synchronous rectifier circuit.

In some embodiments, the comparison circuit further may include a current mirror; where an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and where the comparison circuit is configured to compare the current at the output terminal of the switching circuit with the reference current, and output the control signal received by the synchronous rectifier circuit according to the comparison result, thus adjusting the working mode of the synchronous rectifier circuit.

In accordance with another aspect of the present application, a synchronous rectifier chip is provided. The synchronous rectifier chip may include a protocol chip, the synchronous rectifier chip may include: a control pin configured to control turning on and turning off of a rectifier power tube according to an input signal; and a receiving pin connected to the protocol chip and configured to receive a power supply demand signal characterizing a load device connected to the switching power supply and adjust a working mode of the synchronous rectifier chip.

Implementations may include one or more of the following features. In some embodiments, the receiving pin is connected to an external impedance component.

In some embodiments, the synchronous rectifier chip further may include a signal identification circuit; and where the signal identification circuit is configured to identify the power supply demand signal and adjust the working mode of the synchronous rectifier chip according to the power supply demand signal.

In some embodiments, when the power supply demand signal is a voltage signal or a current signal, the signal identification circuit may include a comparison circuit; where a first input terminal of the comparison circuit is connected to an output terminal of a switching circuit, a second input terminal of the comparison circuit is connected to a reference voltage output device or a reference current output device, and an output terminal of the comparison circuit is connected to the control pin; and where the comparison circuit is configured to compare a voltage at the output terminal of the switching circuit with a reference voltage or compare a current at the output terminal of the switching circuit with a reference current, and output a control signal received by the synchronous rectifier chip according to a comparison result, thus adjusting a working mode of the synchronous rectifier chip.

In some embodiments, the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

In some embodiments, the comparison circuit further may include a current source; where the first input terminal of the comparison circuit is connected to the current source, and the second input terminal of the comparison circuit is connected to the reference voltage output device; and where the comparison circuit is configured to compare a voltage at the output terminal of the switching circuit with the reference voltage, and output the control signal received by the control pin of the synchronous rectifier chip according to the comparison result, thus adjusting a working mode of the synchronous rectifier chip.

In some embodiments, the comparison circuit further may include a current mirror; where an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and where the comparison circuit is configured to compare a current at the output terminal of the switching circuit with the reference current, and output the control signal received by the control pin of the synchronous rectifier chip according to the comparison result, thus adjusting the working mode of the synchronous rectifier chip.

According to yet another aspect of the present application, a protocol chip used in a secondary side of a switching power supply including a synchronous rectifier chip is provided. The protocol chip may includes: a detection pin configured to detect a power supply demand of a load device connected to the protocol chip; and an output pin configured to transmit a power supply demand signal to the synchronous rectifier chip, to adjust a working mode of the synchronous rectifier chip.

In some embodiments, the protocol chip further may include a switching circuit and a detection circuit; where an input terminal of the switching circuit is connected to the detection circuit, and an output terminal of the switching circuit is connected to the output pin; and where the switching circuit is configured to adjust a switching state of the switching circuit according to a detection result outputted by the detection circuit, to output the power supply demand signal via the output pin.

In some embodiments, the switching circuit may include a controllable switching transistor, a control terminal of the controllable switching transistor is connected to the detection pin, and an output terminal of the controllable switching transistor is connected to the output pin.

In some embodiments, the protocol chip may include a constant current and constant voltage control circuit configured to control stability of an output voltage and an output current.

It should also be noted that in the present specification, relational terms such as first, second, etc., are merely used to distinguish an entity or operation from another entity or operation, and it is not necessarily required or implicated that any such actual relationship or order is present between these entities or operations. In addition, the term "include", "comprise", or any other variation thereof is intended to encompass a non-exclusive inclusion, so that a process, method, article, or device that includes a series of elements includes not only those elements but also other elements not explicitly listed, or elements that are inherent to such a process, method, article, or device. The element defined by the statement "including one . . . ", when without further limitation, does not preclude the presence of additional identical elements in a process, method, article, or device that includes said element.

The above description of the embodiments disclosed allows a person professionally skilled in the art to implement or use the present application. Various modifications to the embodiments are obvious to a person professionally skilled in the art, and general principles defined herein may be implemented in other embodiments without departing from the spirit or scope of the present application. Therefore, the present application is not limited to the embodiments described herein, but extends to the widest scope that complies with the principles and novelty disclosed herein.

What is claimed is:

1. A switching power supply comprising:

a protocol circuit disposed on a secondary side of the switching power supply and configured to detect a power supply demand of a load device connected to the protocol circuit;

a synchronous rectifier circuit disposed on the secondary side of the switching power supply and configured to receive a signal from a signal transmission circuit, adjust a working mode of the synchronous rectifier circuit based on the received signal, and control a rectifier power tube; and the signal transmission circuit disposed between the protocol circuit and the synchronous rectifier circuit and configured to transmit the signal between the protocol circuit and the synchronous rectifier circuit.

2. The switching power supply of claim 1, wherein the signal transmission circuit comprises a switching circuit and a signal identification circuit;

wherein an input terminal of the switching circuit is connected to the protocol circuit, an output terminal of the switching circuit is connected to an input terminal of the signal identification circuit, and an output terminal of the signal identification circuit is connected to the synchronous rectifier circuit;

wherein the switching circuit is configured to adjust a switching state of the switching circuit, according to a detection result outputted by the protocol circuit, to output a power supply demand signal; and wherein the signal identification circuit is configured to output a control signal received by the synchronous rectifier circuit, according to the power supply demand signal outputted by the switching circuit, to adjust the working mode of the synchronous rectifier circuit.

3. The switching power supply of claim 2, wherein the switching circuit comprises a controllable switching transistor, a control terminal of the controllable switching transistor is the input terminal of the switching circuit, and an output terminal of the controllable switching transistor is the output terminal of the switching circuit.

4. The switching power supply of claim 3, wherein when the controllable switching transistor is an n-type metal-oxide-semiconductor (NMOS) transistor, a gate of the NMOS transistor is the control terminal of the controllable switching transistor, a source of the NMOS transistor is the output terminal of the controllable switching transistor, and a drain of the NMOS transistor is grounded.

5. The switching power supply of claim 2, wherein an impedance component is disposed between the switching circuit and the signal identification circuit.

6. The switching power supply of claim 2, wherein when the power supply demand signal is a voltage signal or a current signal, the signal identification circuit comprises a comparison circuit;

wherein a first input terminal of the comparison circuit is connected to the output terminal of the switching circuit, a second input terminal of the comparison circuit is connected to a reference voltage output device or a reference current output device, and an output terminal of the comparison circuit is connected to the synchronous rectifier circuit; and wherein the comparison circuit is configured to compare a voltage at the output terminal of the switching circuit with a reference voltage or compare a current at the output terminal of the switching circuit with a reference current, and output the control signal to the synchronous rectifier circuit according to a comparison result, thus adjusting the working mode of the synchronous rectifier circuit.

7. The switching power supply of claim 6, wherein the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

8. The switching power supply of claim 6, wherein the comparison circuit further comprises a current source;

wherein the first input terminal of the comparison circuit is connected to the current source, and the second input terminal of the comparison circuit is connected to the reference voltage output device; and wherein the comparison circuit is configured to compare the voltage at the output terminal of the switching circuit with the reference voltage, and output the control signal received by the synchronous rectifier circuit, according to the comparison result, thus adjusting the working mode of the synchronous rectifier circuit.

9. The switching power supply of claim 6, wherein the comparison circuit further comprises a current mirror;

wherein an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and wherein the comparison circuit is configured to compare the current at the output terminal of the switching circuit with the reference current, and output the control signal received by the synchronous rectifier circuit according to the comparison result, thus adjusting the working mode of the synchronous rectifier circuit.

10. A synchronous rectifier chip, used in a secondary side of a switching power supply comprising a protocol chip, the synchronous rectifier chip comprising:

a control pin configured to control turning on and turning off of a rectifier power tube according to an input signal; and a receiving pin connected to the protocol chip and configured to receive a power supply demand signal characterizing a load device connected to the switching power supply from the protocol chip, and adjust a working mode of the synchronous rectifier chip based on the received power supply demand signal.

11. The synchronous rectifier chip of claim 10, wherein the receiving pin is connected to an external impedance component.

12. The synchronous rectifier chip of claim 10, wherein the synchronous rectifier chip further comprises a signal identification circuit; and wherein the signal identification circuit is configured to identify the power supply demand signal and adjust the working mode of the synchronous rectifier chip according to the power supply demand signal.

13. The synchronous rectifier chip of claim 12, wherein when the power supply demand signal is a voltage signal or a current signal, the signal identification circuit comprises a comparison circuit;

wherein a first input terminal of the comparison circuit is connected to an output terminal of a switching circuit, a second input terminal of the comparison circuit is connected to a reference voltage output device or a reference current output device, and an output terminal of the comparison circuit is connected to the control pin; and wherein the comparison circuit is configured to compare a voltage at the output terminal of the switching circuit with a reference voltage or compare a current at the output terminal of the switching circuit with a reference current, and output a control signal received by the synchronous rectifier chip according to a comparison result, thus adjusting the working mode of the synchronous rectifier chip.

14. The synchronous rectifier chip of claim 13, wherein the comparison circuit is a comparator, a first input terminal of the comparator is the first input terminal of the comparison circuit, a second input terminal of the comparator is the second input terminal of the comparison circuit, and an output terminal of the comparator is the output terminal of the comparison circuit.

15. The synchronous rectifier chip of claim 13, wherein the comparison circuit further comprises a current source;

wherein the first input terminal of the comparison circuit is connected to the current source, and the second input terminal of the comparison circuit is connected to the reference voltage output device; and wherein the comparison circuit is configured to compare a voltage at the output terminal of the switching circuit with the reference voltage, and output the control signal received by the control pin of the synchronous rectifier chip according to the comparison result, thus adjusting the working mode of the synchronous rectifier chip.

16. The synchronous rectifier chip of claim 13, wherein the comparison circuit further comprises a current mirror;

wherein an input terminal of the current mirror is connected to the output terminal of the switching circuit, an output terminal of the current mirror is connected to the first input terminal of the comparison circuit, the second input terminal of the comparison circuit is connected to the reference current output device, and the current mirror is pre-configured with a preset ratio; and wherein the comparison circuit is configured to compare a current at the output terminal of the switching circuit with the reference current, and output the control signal received by the control pin of the synchronous rectifier chip according to the comparison result, thus adjusting the working mode of the synchronous rectifier chip.

17. A protocol chip, used in a secondary side of a switching power supply comprising a synchronous rectifier chip, the protocol chip comprising:

a detection pin configured to detect a power supply demand of a load device connected to the protocol chip; and an output pin configured to transmit a power supply demand signal representing the power supply demand detected by the detection pin to the synchronous rectifier chip, to cause the synchronous rectifier chip to adjust a working mode of the synchronous rectifier chip based on the power supply demand signal.

18. The protocol chip of claim 17, wherein the protocol chip further comprises a switching circuit and a detection circuit;

wherein an input terminal of the switching circuit is connected to the detection circuit, and an output terminal of the switching circuit is connected to the output pin; and wherein the switching circuit is configured to adjust a switching state of the switching circuit according to a detection result outputted by the detection circuit, to output the power supply demand signal via the output pin.

19. The protocol chip of claim 18, wherein the switching circuit comprises a controllable switching transistor, a control terminal of the controllable switching transistor is connected to the detection pin, and an output terminal of the controllable switching transistor is connected to the output pin.

20. The protocol chip of claim 17, further comprising a constant current and constant voltage control circuit configured to control stability of an output voltage and an output current.

* * * * *